(12) United States Patent
Borg

(10) Patent No.: US 7,800,780 B2
(45) Date of Patent: Sep. 21, 2010

(54) N-DIMENSIONAL HEDRAL INTERPOLATION FOR COLOR CONVERSION

(75) Inventor: Lars U. Borg, Saratoga, CA (US)

(73) Assignee: Adobe Systems Incorporated, San Jose, CA (US)

(*) Notice: Subject to any disclaimer, the term of this patent is extended or adjusted under 35 U.S.C. 154(b) by 700 days.

(21) Appl. No.: 11/571,503

(22) PCT Filed: Jun. 30, 2004

(86) PCT No.: PCT/US2004/021222

§ 371 (c)(1),
(2), (4) Date: Aug. 21, 2007

(87) PCT Pub. No.: WO2006/011883

PCT Pub. Date: Feb. 2, 2006

(65) Prior Publication Data

US 2008/0018961 A1 Jan. 24, 2008

(51) Int. Cl.
H04N 1/60 (2006.01)
(52) U.S. Cl. .................. 358/1.9; 358/518; 358/523; 382/167
(58) Field of Classification Search .............. 358/1.9, 358/518–525; 382/162, 167
See application file for complete search history.

(56) References Cited

U.S. PATENT DOCUMENTS 4,511,989 A * 4/1985 Sakamoto .................. 358/525

(Continued)

FOREIGN PATENT DOCUMENTS

EP 0908831 4/1999

(Continued)

OTHER PUBLICATIONS

Simin Baharalou, "International Preliminary Report on Patentability for PCT/US2004/021222, corresponding to U.S. Appl. No. 11/571,503)", to be published by USPTO, 10 pages.

(Continued)

Primary Examiner—Scott A Rogers
(74) Attorney, Agent, or Firm—Fish & Richardson P.C.

(57) ABSTRACT

A method, apparatus, and computer program product implementing techniques to calculate the hedron that contains an input point. An input color value representing a color having n color components is received. A color lookup table organized as an n-dimensional lattice is received, where n is the number of input channels in the color lookup table, each entry in the color lookup table being a vertex in the lattice, the color lookup table having 2n adjacent lattice points that form an n-dimensional cube around the input value, and the color lookup table defining an output color value at each lattice point. n+1 vertices from the 2n vertices of the n-dimensional cube are calculated, the n+1 vertices defining an enclosing hedron that encloses the input value, where the instructions to calculate n+1 vertices perform no branching operations. The enclosing hedron is used to calculate an output value from the input value.

34 Claims, 4 Drawing Sheets

U.S. PATENT DOCUMENTS

| | | | | |
|---|---|---|---|---|
| 5,664,072 | A * | 9/1997 | Ueda et al. | 358/1.9 |
| 6,335,734 | B1 * | 1/2002 | Nagae et al. | 358/518 |
| 7,023,585 | B1 * | 4/2006 | Borg | 358/1.9 |
| 7,215,440 | B2 * | 5/2007 | Klassen et al. | 358/1.9 |
| 7,573,607 | B2 * | 8/2009 | Huan et al. | 358/1.9 |
| 2001/0040686 | A1 | 11/2001 | Schoolcraft et al. | |
| 2004/0109185 | A1 | 6/2004 | Hung et al. | |
| 2009/0285475 | A1 * | 11/2009 | Suzuki | 382/162 |

FOREIGN PATENT DOCUMENTS

| | | |
|---|---|---|
| JP | 2001-275002 | 10/2001 |

OTHER PUBLICATIONS

International Search Report and Written Opinion for PCT Application No. PCT/US2004/021222, dated Feb. 18, 2005, 12 pages.

International Preliminary Report on Patentability for PCT Application No. PCT/US2004/021222, dated Jan. 19, 2007, 10 pages.

European Examination Report for Application No. 04 756 546.0-1228, dated Aug. 27, 2007, 3 pages.

Japanese Office Action for Application No. 2007-519181, dated Sep. 29, 2009, 2 pages.

* cited by examiner

US 7,800,780 B2

N-DIMENSIONAL HEDRAL INTERPOLATION FOR COLOR CONVERSION

BACKGROUND

The present invention relates to digital imaging.

When working with digital images, it is frequently necessary to transform an image from one color space to a second color space; for example, from an RGB (Red Green Blue) color space to a CMYK (Cyan Magenta Yellow blacK) color space. Many methods used for color conversion use a lookup table that is organized as an n-dimensional lattice, with n representing the number of input color channels. In order to determine output values for input values that are between two entries in the look-up table, some sort of interpolation technique is desirable.

In such a table, $2^n$ adjacent lattice points form an n-dimensional cube around a provided input value, for which an output value is desired. To facilitate computation, most methods transform the input values so that 0 in all channels maps to the vertex of the cube with the lowest values in all input channels (which will be referred to as the starting point), and 1 in all channels maps to the vertex with the highest values in all input channels (which will be referred to as the end point). A method commonly known as linear interpolation uses all $2^n$ adjacent lattice points to calculate an output value. However, this method is quite slow, as the number of terms that must be calculated is $m \times 2^n$, where m is the number of output channels.

In hedral methods, the cube is subdivided into n! subvolumes, known as hedra, each with n+1 vertices. For example, six tetrahedra are used for three input channels, and 24 hedra are used for four input channels. The starting point, the end point, and the line between these two points (the diagonal of the cube) are shared by all hedra. The hedron that encloses the input point is used to calculate the output value. Because only n+1 vertices are used, the output value can be obtained by only calculating n+1 terms, which is much faster than using the linear interpolation method.

SUMMARY

The present invention provides methods and apparatus, including computer program products, implementing techniques for a fast and general way to calculate the hedron that contains the input point, particularly for large n.

In one aspect, the techniques feature the following. An input value representing a color having n color components is received. The color lookup table organized as an n-dimensional lattice is received, where n is the number of input channels in the color lookup table, each entry in the color lookup table being a vertex in the lattice, the color lookup table having $2^n$ adjacent lattice points that form an n-dimensional cube around the input value, the color lookup table defining an output color value at each lattice point, and the color lookup table having a spacing between lattice points for each dimension, the spacing for the k-th dimension being the distance between entries in the color lookup table that are adjacent lattice points in the k-th dimension and have identical lattice coordinates in all other dimensions. The spacings are used to calculate the addresses in the color lookup table of n vertices that define an enclosing hedron that encloses the input value, the other vertex that defines the enclosing hedron being the cube vertex with the lowest values in all input channels, each vertex of the enclosing hedron being a vertex of the n-dimensional cube in the color lookup table. The enclosing hedron is used to calculate an output value from the input value.

Implementations may include one or more of the following features. The base is the starting vertex spacing[k] is the spacing between lattice points for the k-th dimension. v[i] is the value for the input channel i. The function (a<b) returns the value 1 if true, and zero otherwise. The address of each vertex i is calculated to satisfy the equations $$\text{address}0[i] = \text{base} + \left(\sum_{k=1}^{i-1}(v[i] \leq v[k]) \times \text{spacing}[k]\right) + \left(\sum_{k=i+1}^{n}(v[i] < v[k]) \times \text{spacing}[k]\right)$$

and address1[i]=address0[i]+spacing[i]. base[j] represents the value of output channel j at the address of the starting point. (address0[i])[j] represents the value of output channel j at the address of the vertice address0[i]. (address1[i])[j] represents the value of output channel j at the address of the vertice address1[i]. output[j] is the output value for channel j. The output value for each input value is calculated to satisfy the equation $$\text{output}[j] = \text{base}[j] + \left(\sum_{i=1}^{n} v[i] \times ((\text{address}1[i])[j] - (\text{address}0[i])[j])\right).$$

The vertex addresses are calculated by utilizing the offsets, such that address[i]=base+offset[i]. The offset of each vertex i is calculated to satisfy the equations $$\text{offset}0[i] = \left(\sum_{k=1}^{i-1}(v[i] \leq v[k]) \times \text{spacing}[k]\right) + \left(\sum_{k=i+1}^{n}(v[i] < v[k]) \times \text{spacing}[k]\right).$$

The output value for each input value is calculated to satisfy the equation $$\text{output}[j] = \text{base}[j] + \left(\sum_{i=1}^{n} v[i] \times ((\text{base}[i] + \text{offset}1[i])[j] - (\text{base}[i] + \text{offset}0[i])[j])\right).$$

The addresses of the vertices are calculated one input channel at a time. The addresses of the vertices are calculated in parallel. The number of color components n is any integer value greater than or equal to 2. The order of the input channel values is not sorted.

In another aspect, the techniques feature the following. An input color value representing a color having n color components is received. A color lookup table organized as an n-dimensional lattice is received, where n is the number of input channels in the color lookup table, each entry in the color lookup table being a vertex in the lattice, the color lookup table having $2^n$ adjacent lattice points that form an n-dimensional cube around the input value, and the color lookup table defining an output color value at each lattice point. n+1 vertices from the $2^n$ vertices of the n-dimensional cube are calculated, the n+1 vertices defining an enclosing hedron that encloses the input value, where the instructions to calculate n+1 vertices perform no branching operations. The enclosing hedron is used to calculate an output value from the input value.

Implementations may include one or more of the following techniques. The addresses of the vertices are calculated one input channel at a time. The addresses of the vertices are calculated in parallel. The number of color components n is any value greater than or equal to 2. The order of the input channel values is not sorted.

In another aspect, the techniques feature the following. An input value is received representing a color having n color components. A color lookup table organized as an n-dimensional lattice is received, where n is the number of input channels in the color lookup table, each entry in the color lookup table being a vertex in the lattice, the color lookup table having $2^n$ adjacent lattice points that form an n-dimensional cube around the input value, and the color lookup table defining an output color value at each lattice point. Addresses of the hedral vertices for all channels i are calculated, where the addresses of the hedral vertices define a hedron that encloses the input value, and the address of the vertex to use for value 1 of channel i is determined by calculating the address of the vertex to use for value 0 of channel i and adding the difference in address space between the vertices for channel i.

Implementations of the invention can include one or more of the following features.

The techniques further include interpolating output color coordinates for an output value corresponding to the input value by utilizing the addresses of the hedral vertices of the enclosing hedron.

The invention can be implemented to realize one or more of the following advantages. Faster interpolation in multi-dimensional color tables may be accomplished, compared to conventional interpolation methods. The interpolation may be significantly faster than conventional linear interpolation for color spaces having four or more dimensions. The invention is easy to implement for an arbitrary number of complex color spaces with multiple dimensions and can be coded without knowing the number of dimensions of the source color space. The number of computer instructions required to perform this interpolation is very small. Only the addresses of the vertices for the one hedron that contains the input value need be calculated. The interpolation can be implemented without conditional branching, which further improves efficiency when using computer processors constructed with a single instruction/multiple data (SIMD) architecture.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
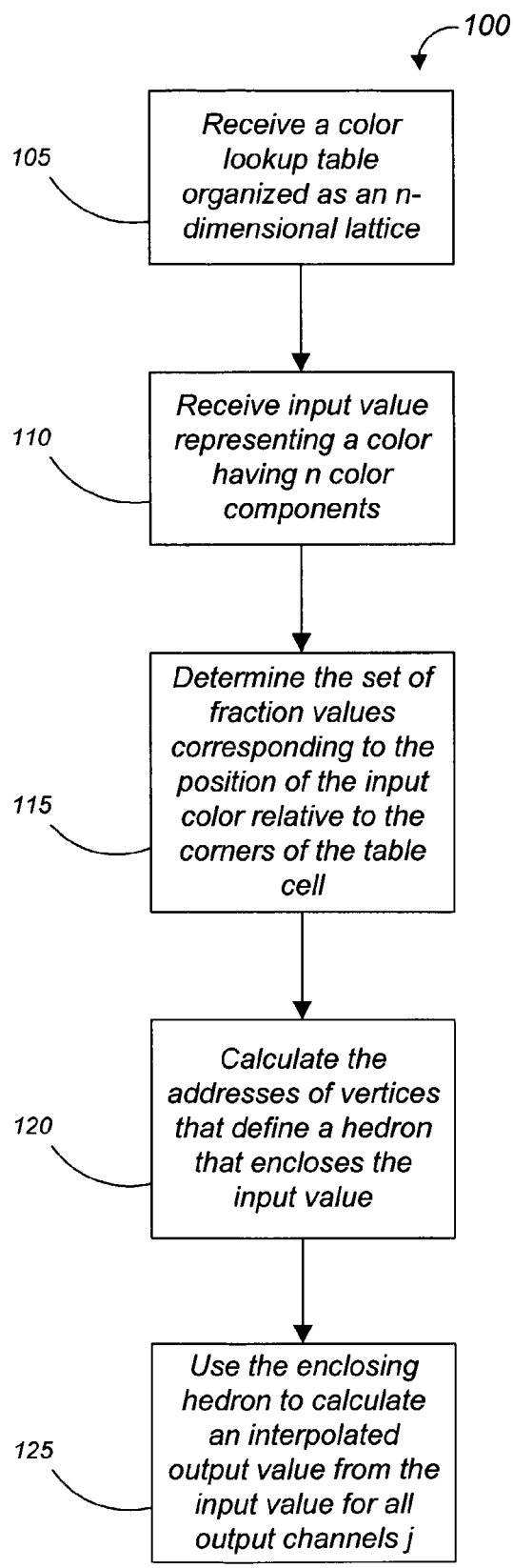
FIG. 1 is a flowchart describing a first implementation of the interpolation method in accordance with the invention.
Figure 2A:
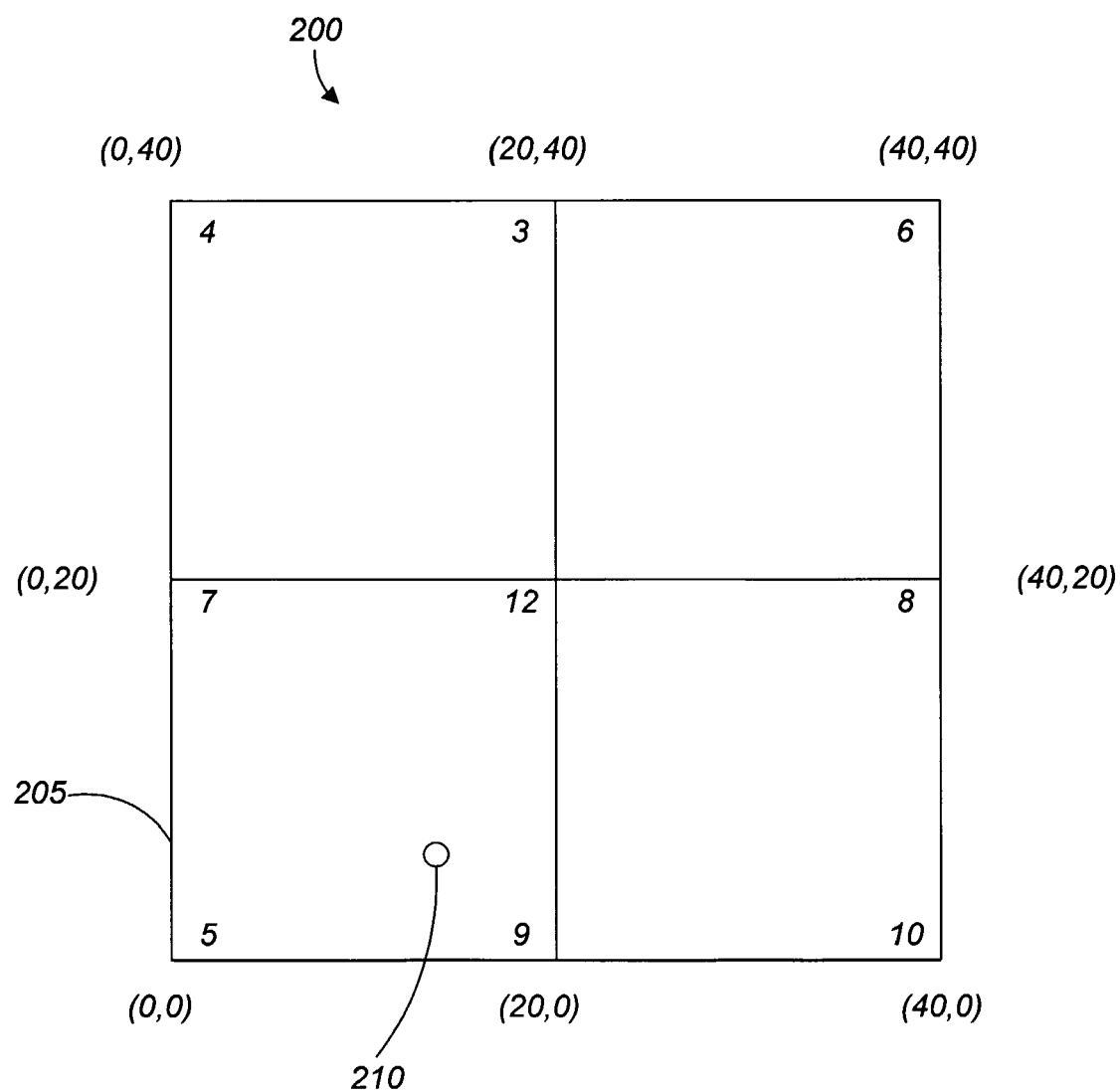
FIG. 2A is a schematic view of a simple color table that maps a two-dimensional source color space to a one-dimensional destination color space.

As shown in FIG. 1, a first implementation method 100 in accordance with the invention receives a color lookup table organized as an n-dimensional lattice (step 105). A simple example of such a color lookup table (table 200) can be found in FIG. 2A. The table 200 has four table cells and defines a conversion between a two-dimensional source color space and a one-dimensional destination color space. An input color 210 represented by two input color components in a source color space can be converted to an output color that is represented by one output color component in a destination color space using the table. The table contains a set of reference source colors and a corresponding set of reference destination colors. A summary of the reference source colors and the reference destination colors is found in Table 1 below.

TABLE 1

| Reference source color component 1 | Reference source color component 2 | Corresponding reference destination color component |
| --- | --- | --- |
| 0 | 0 | 5 |
| 0 | 20 | 7 |
| 0 | 40 | 4 |
| 20 | 0 | 9 |
| 20 | 20 | 12 |
| 20 | 40 | 3 |
| 40 | 0 | 10 |
| 40 | 20 | 8 |
| 40 | 40 | 6 |

The table in the present example maps colors from a two-dimensional source color space to a one-dimensional destination color space. However, most devices work with three-dimensional, four-dimensional, or even higher dimensional color spaces. The color table presented above should therefore only be viewed as an illustrative example. The color table does not necessarily have to be limited to mapping colors between two color spaces only. Mappings between several color spaces can be combined into a large "multi-layer" color table. From an administrative point of view, it may be easier to manage a single large table rather than multiple smaller color tables.

An input value representing a color having n color components is received (step 110). For the purpose of this example, assume that a two-color dimensional input color $C_{in}=(14, 6)$ needs to be transformed to a one-dimensional output color $C_{out}$ using a process in accordance with the invention. The table cell 205 containing the input color 210 in the table 200 is located, based on the input color component values. The table cell containing the input color is found by dividing each of the input color component values with the number of color component values per cell for the respective cell dimensions, and identifying the integer part of the result of the division. In this example, each cell has 20 by 20 color values, so 14/20=0.7 and 6/20=0.3. The integer part of both of these divisions is equal to zero, which means that the input color is located in the first cell in the X-direction and the first cell in the Y-direction. The starting point is the vertex of the cell containing the input color that has the smallest value for each source color. In this example, the point (0, 0) is the starting point. The cells do not need to have the same number of color component values for each dimension; for instance, each cell in a table for a two-dimensional color space may have 15 by 20 color values, instead of 20 by 20 color values.

Figure 2B:
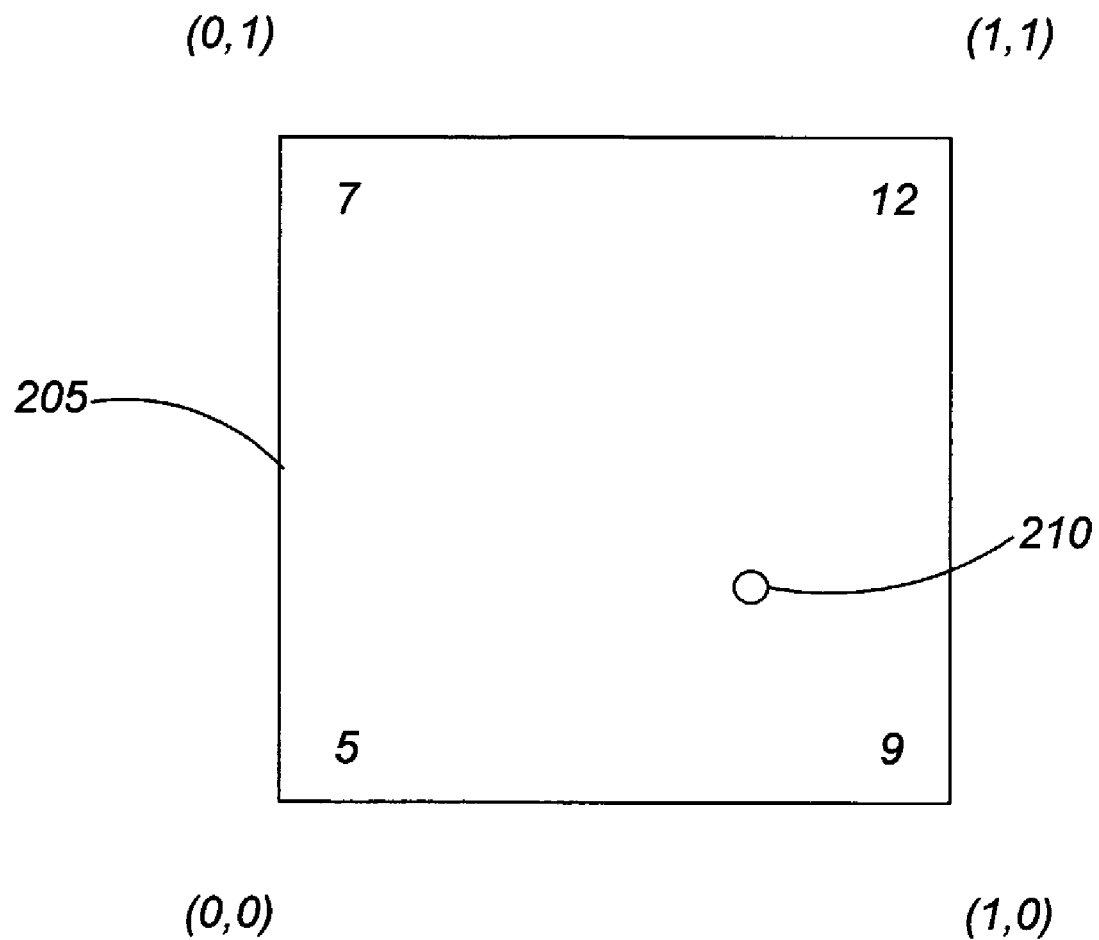
FIG. 2B is a schematic view of a table cell in color table shown in FIG. 2A.

A set of fraction values corresponding to the position of the input color relative to the corners of the table cell is determined (step 115). In the present example, the determined fraction values are in the range [0 . . . 1[, except for the last cell of the table where the fraction values are in the range [0 . . . 1], and correspond to coordinate values in a local coordinate system for the cell, where the origin is at the lower left corner of the cell and the length and height of the cell is one unit, as shown in FIG. 2B. The notation [0 . . . 1[ denotes a half-closed interval, that is, including 0 but not 1, and [0 . . . 1] denotes a closed interval, that is, including both 0 and 1.

In the present example, the input value has been transformed as described above such that the input values are in the range [0 . . . 1] for points in the cell. Since the input color components are (14, 6) and the dimension of the cell in the color table is 20 by 20 color values, the fraction values, or coordinates of the input color in the cell's local coordinate system are (0.7, 0.3). These fraction values are also known as the channel values.

Figure 3:
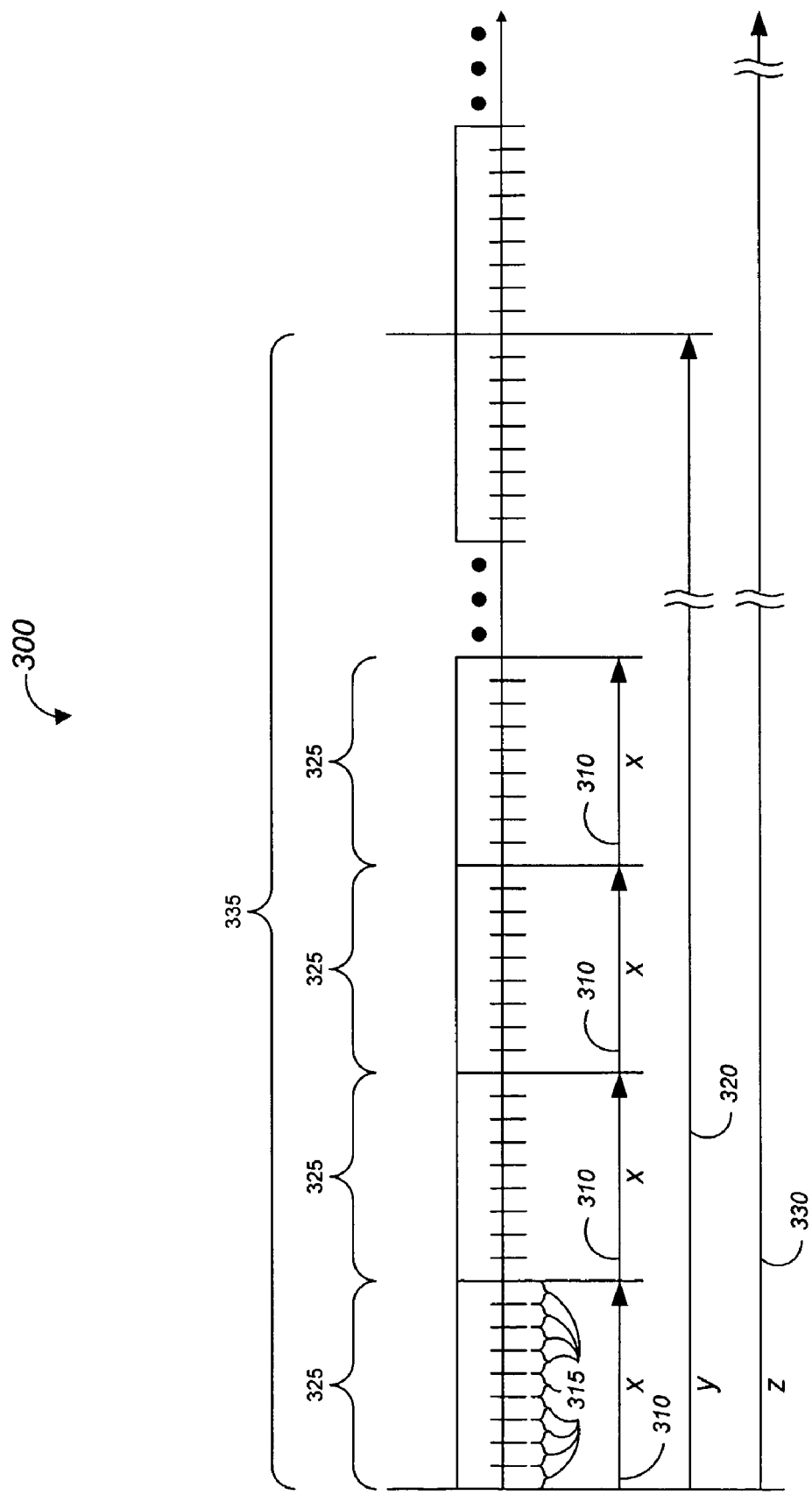
FIG. 3 is a representation of a three-dimensional color table laid out in a linear address space.

FIG. 3 is an example of a three-dimensional color table laid out in an address space in computer memory. In this example, address space 300 contains values for an x-dimension, y-dimension, and z-dimension arranged linearly with the x values changing most rapidly, then the y values, then the z values. For example, for a particular y value 320 and z value 330, there is a set of adjacent x values 310. A unique memory address 315 exists for each value of x where y and z are held constant. A similar unique memory address is associated with every combination of input color components x, y, and z in the source color space. In one implementation, this memory address is where the reference output values for a specific vertex are stored; in other words, it represents one vertex tuple. As a consequence of this arrangement, there is the unit spacing between data points within the x dimension (space x 315), y dimension (space y 325) and z dimension (space z 335). In this specification, the value of the distance in the address space between adjacent data points is referred to as spacing[x], spacing[y], and spacing [z] for channels x, y, and z, respectively. In general, the distance in the address space depends on the number of dimensions of the table, how the table is laid out in the address space, and how many color values are present in each table cell.

The process calculates the addresses of vertices that define a hedron that encloses the input value (step 120). The address of the vertex to use for value 0 of channel i when interpolating will be denoted as address0[i]. Similarly, the address of the vertex to use for value 1 of channel i when interpolating will be denoted as address1[i]. Therefore, $$\text{address0}[i] =$$

$$\text{base} + \left(\sum_{k=1}^{i-1} (v[i] \leq v[k]) \times \text{spacing}[k]\right) + \left(\sum_{k=i+1}^{n} (v[i] < v[k]) \times \text{spacing}[k]\right),$$

where base is the address of the starting point in the color table, v[i] is the channel value for input channel i, where the range [0 . . . 1] spans the table cell, and spacing[k] is the distance in address space between vertices for channel k, as described above. The input channels i range from 1 to n. The function (a<b) returns the value 1 if a<b, and 0 otherwise, and where the function (a≦b) returns the value 1 if a≦b, and 0 otherwise. Alternatively, any function that returns the same result as the function (a<b) for the range [0 . . . 1] may be used. For example, int(b−a+1) also returns a value of 1 if a<b, and 0 otherwise.

Although the exact same results will result when using this method whether the term (v[i]≦v[k]) or (v[i]<v[k]) is used, the mix of < and ≦ operands offers a performance advantage. As (v[i]<v[k]) is the inverse of (v[k]≦v[i]), and because the loops of i and k will activate all combinations of these functions, an optimizing compiler or parallel hardware arrangement can take advantage of this inverse relationship by performing half as many calculations as otherwise would be necessary.

The address of the vertex to use for value 1 of channel i is address1[i]=address0[i]+spacing[i].

The process uses the enclosing hedron to calculate an interpolated output value from the input value for all output channels j (step 125). The output channels j range from 1 to m. The interpolated output value for each channel is calculated by applying the function $$\text{output}[j] = \text{base}[j] + \left(\sum_{i=1}^{n} v[i] \times ((\text{address1}[i])[j] - (\text{address0}[i])[j])\right),$$

where address0[i])[j] and (address1[i])[j] represents the contents of output channel j at vertices address0[i] and address1[i] respectively. Similarly, base[j] represents the value of output channel j at the address of the starting point. Accordingly, output[j] is the interpolated channel value for output channel j.

The pseudo-code in the following table shows an alternative implementation of the invention.

```
for(i=0;i<n;i++)           {
    address0[i] = base;
    for(k=0;k<i;k++)           {
        if(v[i]<=v[k])
            address0[i] += spacing[k];
    }
    for(k=i+1;k<n;k++)           {
        if(v[i]<v[k])
            address0[i] += spacing[k];
    }
    address1[i] = address0[i] + spacing[i];
}
for(j=0;j<m;j++)      output[j]=base[j];
for(i=0;i<n;i++)           {
    for(j=0;j<m;j++)           {
        output[j] += v[i] * ((address1[i])[j]) − (address0[i])[j]);
    }
}
```

The process can be implemented with code that does not contain any conditional branching, even though the pseudo-code shown includes "if" statements, because these can be reduced to a logical computation followed by a multiplication by a number that is either 1 or 0. For example, the section of code

```
if(v[i]<=v[k])
    address0[i] += spacing[k];
``` can be replaced by the following statement

```
address0[i] += (v[i]<=v[k]) * spacing[k];
``` where the expression (v[i]<=v[k]) returns a value of 1 if true and a value of 0 if false.

The process can also be implemented without loops. This is particularly true for small n. Further, as mentioned above, without loops a compiler can optimize away half of the comparisons as (s<t)=!(t<=s). For example, where n=4 and m=3, the following pseudo-code, without any loops, can be implemented.

```
cs0 = &c0000              + (s<t) * spcT   + (s<u) * spcU   + (s<v) * spcV;
ct0 = &c0000 + (t<=s) * spcS              + (t<u) * spcU   + (t<v) * spcV;
cu0 = &c0000 + (u<=s) * spcS   + (u<=t) * spcT              + (u<v) * spcV;
cv0 = &c0000 + (v<=s) * spcS   + (v<=t) * spcT   + (v<=u) * spcU;
cs1 = cs0 + spcS;
ct1 = ct0 + spcT;
cu1 = cu0 + spcU;
cv1 = cv0 + spcV;
p = c0000.p + s*(cs1.p-cs0.p) + t*(ct1.p-ct0.p) + u*(cu1.p-cu0.p) + v*(cv1.p-cv0.p);
q = c0000.q + s*(cs1.q-cs0.q) + t*(ct1.q-ct0.q) + u*(cu1.q-cu0.q) + v*(cv1.q-cv0.q);
r = c0000.r + s*(cs1.r-cs0.r) + t*(ct1.r-ct0.r) + u*(cu1.r-cu0.r) + v*(cv1.r-cv0.r);
```

In the above example, c0000 represents the starting point, and spcS, spcT, spcU, and spcV represent the corner spacing constants for each of the four input channels.

The lack of conditional branching greatly improves the efficiency of an implementation of this process, particularly for processors utilizing a single instruction/multiple data (SIMD) architecture. The processing time for these processes is proportional to n×(n+m), which is much faster for a large value of n than the linear interpolation method, where the processing time is proportional to m×2$^n$. The code size required to implement these processes is n×(n+m), as compared to hedral interpolations methods where every hedral vertex must be calculated, which requires a code size of n!×(n+m).

In an alternative implementation, a memory offset can be calculated instead of using the memory addresses, such that address[i]=base+offset[i]. Using this alternative implementation, $$\text{offset0}[i] = \left(\sum_{k=1}^{i-1} (v[i] \le v[k]) \times \text{spacing}[k]\right) + \left(\sum_{k=i+1}^{n} (v[i] < v[k]) \times \text{spacing}[k]\right)$$

and offset1[i]=offset0[i]+spacing[i]. Accordingly, the interpolated output value for each channel j is calculated by applying the function $$\text{output}[j] = \text{base}[j] + \left(\sum_{i=1}^{n} v[i] \times ((\text{base}[i] + \text{offset1}[i])[j] - (\text{base}[i] + \text{offset0}[i])[j])\right).$$

Using offsets rather than memory addresses may offer a performance advantage with certain types of computer processors.

The implementations of the invention described above are functional and efficient in particular for processing tables for input colors having more than four input color components. At the same time, the processes work well for any number of dimensions, starting with two dimension only.

The invention and all of the functional operations described in this specification can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A computer program product, tangibly embodied in a machine-readable storage device, comprising instructions operable to cause data processing apparatus to:
   receive an input value representing a color having n color components;
   receive a color lookup table organized as an n-dimensional lattice, where n is the number of input channels in the color lookup table, each entry in the color lookup table being a vertex in the lattice, the color lookup table having $2^n$ adjacent lattice points that form an n-dimensional cube around the input value, the color lookup table defining an output color value at each lattice point, and the color lookup table having a spacing between lattice points for each dimension, the spacing for the k-th dimension being the distance between entries in the color lookup table that are adjacent lattice points in the k-th dimension and have identical lattice coordinates in all other dimensions;
   use the spacings to calculate the addresses in the color lookup table of n vertices that define an enclosing hedron that encloses the input value, the other vertex that defines the enclosing hedron being the cube vertex with the lowest values in all input channels, which is called the starting vertex, each vertex of the enclosing hedron being a vertex of the n-dimensional cube in the color lookup table; and
   use the enclosing hedron to calculate an output value from the input value.

2. The computer program product of claim 1, wherein:
   spacing[k] is the spacing between lattice points for the k-th dimension;
   base is the starting vertex;
   v[i] is the value for the input channel i;
   the function (a<b) returns the value 1 if true, and zero otherwise; and
   the address of each vertex i is calculated to satisfy the equations $$\text{address0}[i] = \text{base} + \left(\sum_{k=1}^{i-1} (v[i] \le v[k]) \times \text{spacing}[k]\right) +$$

$$\left(\sum_{k=i+1}^{n} (v[i] < v[k]) \times \text{spacing}[k]\right)$$

$$\text{address1}[i] = \text{address0}[i] + \text{spacing}[i].$$

3. The computer program product of claim 2, wherein:
   base[j] represents the value of output channel j at the address of the starting point;
   (address[i])[j] represents the value of output channel j at the address value address[i];
   output[j] is the output value for channel j; and
   the output value for each input value is calculated to satisfy the equation $$\text{output}[j] = \text{base}[j] + \left(\sum_{i=1}^{n} v[i] \times ((\text{address1}[i])[j] - (\text{address0}[i])[j])\right).$$

4. The computer program product of claim 1, wherein:
   the vertex addresses are calculated by utilizing the offsets, such that address[i]=base+offset[i].

5. The computer program product of claim 4, wherein:
   spacing[k] is the spacing between lattice points for the k-th dimension;
   v[i] is the value for the input channel i;
   the function (a<b) returns the value 1 if true, and zero otherwise; and
   the offset of each vertex i is calculated to satisfy the equations $$\text{offset0}[i] =$$

$$\left(\sum_{k=1}^{i-1} (v[i] \le v[k]) \times \text{spacing}[k]\right) + \left(\sum_{k=i+1}^{n} (v[i] < v[k]) \times \text{spacing}[k]\right).$$

6. The computer program product of claim 5, wherein:
   base[j] represents the value of output channel j at the address of the starting point;
   (address[i])[j] represents the value of output channel j at the address value address[i];
   output[j] is the output value for channel j; and
   the output value for each input value is calculated to satisfy the equation $$\text{output}[j] =$$

$$\text{base}[j] + \left(\sum_{i=1}^{n} v[i] \times ((\text{base}[i] + \text{offset1}[i])[j] - (\text{base}[i] + \text{offset0}[i])[j])\right).$$

7. The computer program product of claim 1, wherein the addresses of the vertices are calculated one input channel at a time.

8. The computer program product of claim 1, wherein the addresses of the vertices are calculated in parallel.

9. The computer program product of claim 1, wherein the number of color components n is any integer value greater than or equal to 2.

10. The computer program product of claim 1, wherein the order of the input channel values is not sorted.

11. A computer program product, tangibly embodied in machine-readable storage device, comprising instructions operable to cause data processing apparatus to:
    receive an input color value representing a color having n color components;
    receive a color lookup table organized as an n-dimensional lattice, where n is the number of input channels in the color lookup table, each entry in the color lookup table being a vertex in the lattice, the color lookup table having $2^n$ adjacent lattice points that form an n-dimensional cube around the input value, the color lookup table defining an output color value at each lattice point;

calculate n+1 vertices from the $2^n$ vertices of the n-dimensional cube, the n+1 vertices defining an enclosing hedron that encloses the input value, wherein the instructions to calculate n+1 vertices perform no branching operations; and use the enclosing hedron to calculate an output value from the input value.

12. The computer program product of claim 11, wherein the addresses of the vertices are calculated one input channel at a time.

13. The computer program product of claim 11, wherein the addresses of the vertices are calculated in parallel.

14. The computer program product of claim 11, wherein the number of color components n is any value greater than or equal to 2.

15. The computer program product of claim 11, wherein the order of the input channel values is not sorted.

16. A computer program product, tangibly embodied in a machine-readable storage device, comprising instructions operable to cause data processing apparatus to:

receive an input value representing a color having n color components;

receive a color lookup table organized as an n-dimensional lattice, where n is the number of input channels in the color lookup table, each entry in the color lookup table being a vertex in the lattice, the color lookup table having $2^n$ adjacent lattice points that form an n-dimensional cube around the input value, the color lookup table defining an output color value at each lattice point; and calculate addresses of the hedral vertices for all channels i, where the addresses of the hedral vertices define a hedron that encloses the input value, and the address of the vertex to use for value 1 of channel i is determined by calculating the address of the vertex to use for value 0 of channel i and adding the difference in address space between the vertices for channel i.

17. The computer program product of claim 16, further comprising of instructions operable to cause data processing apparatus to:

interpolate output color coordinates for an output value corresponding to the input value by utilizing the addresses of the hedral vertices of the enclosing hedron.

18. An apparatus comprising:

means for receiving an input value representing a color having n color components;

means for receiving a color lookup table organized as an n-dimensional lattice, where n is the number of input channels in the color lookup table, each entry in the color lookup table being a vertex in the lattice, the color lookup table having $2^n$ adjacent lattice points that form an n-dimensional cube around the input value, the color lookup table defining an output color value at each lattice point, and the color lookup table having a spacing between lattice points for each dimension, the spacing for the k-th dimension being the distance between entries in the color lookup table that are adjacent lattice points in the k-th dimension and have identical lattice coordinates in all other dimensions;

means for using the spacings to calculate the addresses in the color lookup table of n vertices that define an enclosing hedron that encloses the input value, the other vertex that defines the enclosing hedron being the cube vertex with the lowest values in all input channels, each vertex of the enclosing hedron being a vertex of the n-dimensional cube in the color lookup table; and means for using the enclosing hedron to calculate an output value from the input value.

19. The apparatus of claim 18, wherein:

spacing[k] is the spacing between lattice points for the k-th dimension;

base is the starting vertex;

v[i] is the value for the input channel i;

the function (a<b) returns the value 1 if true, and zero otherwise; and the address of each vertex i is calculated to satisfy the equations $$\text{address0}[i] = base + \left(\sum_{k=1}^{i-1} (v[i] \leq v[k]) \times \text{spacing}[k]\right) +$$

$$\left(\sum_{k=i+1}^{n} (v[i] < v[k]) \times \text{spacing}[k]\right)$$

$$\text{address1}[i] = \text{address0}[i] + \text{spacing}[i].$$

20. The apparatus of claim 19, wherein:

base[j] represents the value of output channel j at the address of the starting point;

(address0[i])[j] represents the value of output channel j at the address of the vertice address0[i];

(address1[i])[j] represents the value of output channel j at the address of the vertice address1[i];

output[j] is the output value for channel j; and the output value for each input value is calculated to satisfy the equation $$\text{output}[j] = \text{base}[j] + \left(\sum_{i=1}^{n} v[i] \times ((\text{address1}[i])[j] - (\text{address0}[i])[j])\right).$$

21. The apparatus of claim 18, wherein:

the vertex addresses are calculated by utilizing the offsets, such that address[i]=base+offset[i].

22. The apparatus of claim 21, wherein:

spacing[k] is the spacing between lattice points for the k-th dimension;

v[i] is the value for the input channel i;

the function (a<b) returns the value 1 if true, and zero otherwise; and the offset of each vertex i is calculated to satisfy the equations $$\text{offset0}[i] = \left(\sum_{k=1}^{i-1} (v[i] \leq v[k]) \times \text{spacing}[k]\right) + \left(\sum_{k=i+1}^{n} (v[i] < v[k]) \times \text{spacing}[k]\right).$$

23. The apparatus of claim 22, wherein:

base[j] represents the value of output channel j at the address of the starting point;

(address[i])[j] represents the value of output channel j at the address value address[i];

output[j] is the output value for channel j; and the output value for each input value is calculated to satisfy the equation $$\text{output}[j] = \text{base}[j] + \left(\sum_{i=1}^{n} v[i] \times ((\text{base}[i] + \text{offset1}[i])[j] - (\text{base}[i] + \text{offset0}[i])[j])\right).$$

24. The apparatus of claim 18, wherein the addresses of the vertices are calculated one input channel at a time.

25. The apparatus of claim 18, wherein the addresses of the vertices are calculated in parallel.

26. The apparatus of claim 18, wherein the number of color components n is any integer value greater than or equal to 2.

27. The apparatus of claim 18, wherein the order of the input channel values is not sorted.

28. An apparatus comprising:
   means for receiving an input color value representing a color having n color components;
   means for receiving a color lookup table organized as an n-dimensional lattice, where n is the number of input channels in the color lookup table, each entry in the color lookup table being a vertex in the lattice, the color lookup table having $2^n$ adjacent lattice points that form an n-dimensional cube around the input value, the color lookup table defining an output color value at each lattice point;
   means for calculating n+1 vertices from the $2^n$ vertices of the n-dimensional cube, the n+1 vertices defining an enclosing hedron that encloses the input value, wherein the instructions to calculate n+1 vertices perform no branching operations; and
   means for using the enclosing hedron to calculate an output value from the input value.

29. The apparatus of claim 28, wherein the addresses of the vertices are calculated one input channel at a time.

30. The apparatus of claim 28, wherein the addresses of the vertices are calculated in parallel.

31. The apparatus of claim 28, wherein the number of color components n is any value greater than or equal to 2.

32. The apparatus of claim 28, wherein the order of the input channel values is not sorted.

33. An apparatus comprising:
   means for receiving an input value representing a color having n color components;
   means for receiving a color lookup table organized as an n-dimensional lattice, where n is the number of input channels in the color lookup table, each entry in the color lookup table being a vertex in the lattice, the color lookup table having $2^n$ adjacent lattice points that form an n-dimensional cube around the input value, the color lookup table defining an output color value at each lattice point; and
   means for calculating addresses of the hedral vertices for all channels i, where the addresses of the hedral vertices define a hedron that encloses the input value, and the address of the vertex to use for value 1 of channel i is determined by calculating the address of the vertex to use for value 0 of channel i and adding the difference in address space between the vertices for channel i.

34. The apparatus of claim 33, further comprising:
   means for interpolating output color coordinates for an output value corresponding to the input value by utilizing the addresses of the hedral vertices of the enclosing hedron.

* * * * *